Oct. 21, 1958     I. C. KLINGLER     2,856,673
BOX TOOL
Filed April 9, 1954
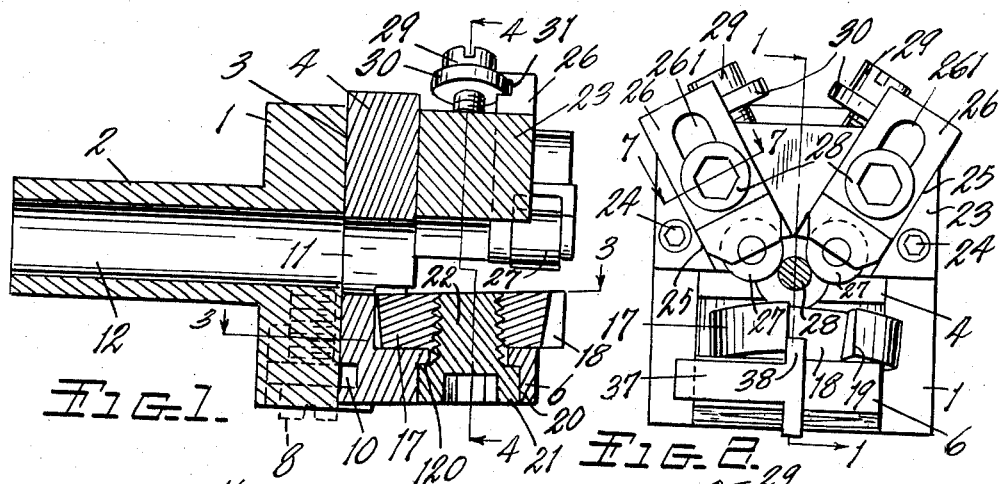
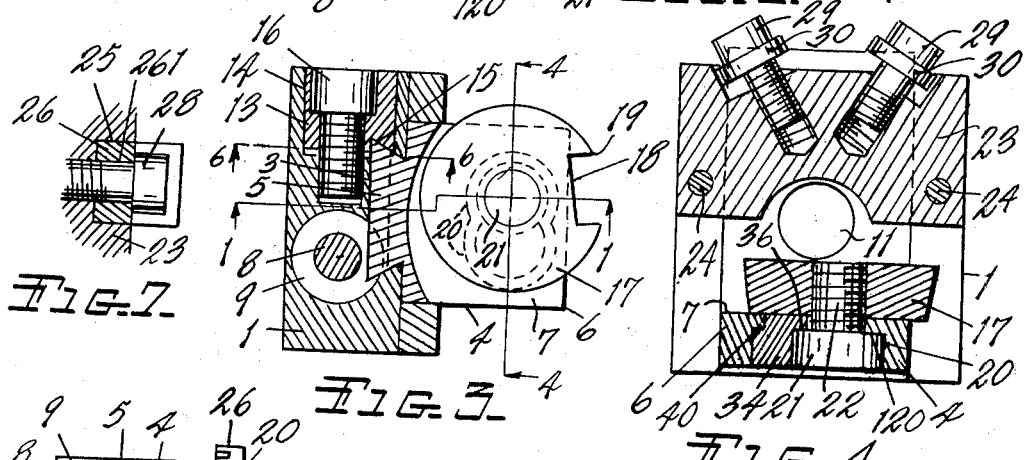
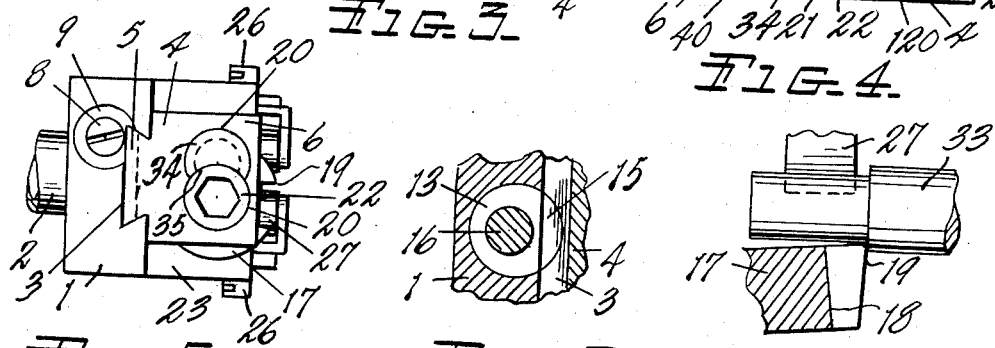
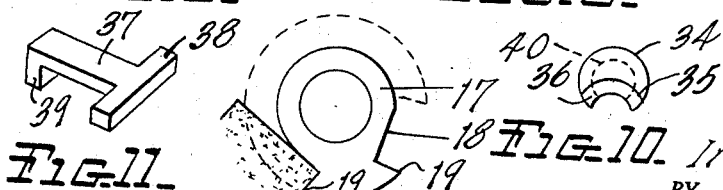
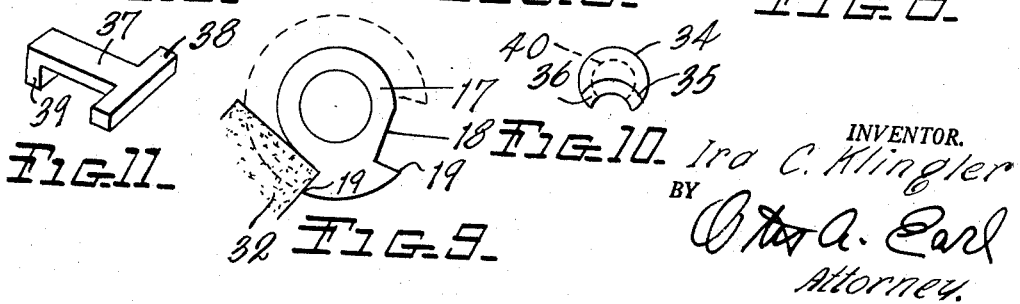
INVENTOR.
Ira C. Klingler
BY
Otto A. Earl
Attorney.

2,856,673
BOX TOOL

Ira C. Klingler, St. Petersburg, Fla.

Application April 9, 1954, Serial No. 422,142

5 Claims. (Cl. 29—98)

This invention relates to improvements in a box tool. The main objects of this invention are:

First, to provide a box tool which is readily adapted for right and left hand cuts.

Second, to provide a box tool in which the cutter is designed for very long use and is easily sharpened to maintain the desired cutting edge.

Third, to provide a box tool which is easily and accurately adjusted to a wide range of work.

Fourth, to provide a structure having these advantages which is compact and at the same time strong and durable.

Fifth, to provide a tool setting gauge facilitating the adjustment of the tool from right and left hand cuts.

Objects relating to details and economies of the invention will definitely appear from the description to follow. The invention is defined in the claims.

A structure which embodies the features of the invention is clearly illustrated in the accompanying drawing in which:

Fig. 1 is a longitudinal section on a line corresponding to line 1—1 of Fig. 2, work being shown in section.

Fig. 2 is a front elevational view with the work rest in fully retracted position, the cutter being shown in one of its possible adjusted positions, a tool setting gauge being shown to illustrate the use thereof.

Fig. 3 is a fragmentary view in horizontal section on a line corresponding to line 3—3 of Fig. 1.

Fig. 4 is a transverse section on a line corresponding to broken line 4—4 of Figs. 1 and 3.

Fig. 5 is an inverted view reduced in size as compared to other figures.

Fig. 6 is a fragmentary view in section on line 6—6 of Fig. 3.

Fig. 7 is a fragmentary view in section on a line corresponding to line 7—7 of Fig. 2.

Fig. 8 is a fragmentary view illustrating the relation of the work to the cutter and the work rests.

Fig. 9 is a conventional view illustrating the tool being sharpened. Dotted lines show the original contour of the cutter.

Fig. 10 is an outer end view of an insert or filler for one of the pair of tool clamping screw recesses.

Fig. 11 is a perspective view of the tool adjusting gauge.

The embodiment of the invention illustrated comprises a body member 1 provided with a tubular shank 2 by means of which the tool may be mounted. The body member is provided with a dovetailed way 3 for the tool slide which has a dovetailed portion 5 coacting with the dovetailed portion of the way. The slide is provided with a forwardly projecting tool rest 6 having a rearwardly inclined face or cutter seat 7. This is desirably formed as one piece. The tool holder or slide 4 is adjusted in its way by means of the adjusting screw 8 threaded into the body member and provided with an annular flange 9 engaging the slot 10 in the tool holder as shown in Figs. 1, 3, 5 and 7. The tool holder is provided with a work receiving bore 11 generally alignable with the bore 12 of the body member and its shank.

The tool holder is secured in its adjusted positions by means of the clamp 13 which is disposed in a recess 14 opening laterally to the way, the recess and the clamping member being shaped to prevent rotative movement of the clamping member or jaw which has a face 15 shaped to complement the way and engage the adjacent edge of the tool holder. The screw 16 securely clamps the clamping member 13 on the tool holder.

The tool 17 is desirably circular and downwardly tapered or slightly conical as illustrated. This tool is provided with a peripheral notch 18 which is desirably formed to provide two cutting edges 19. The face of the tool seat being inclined slightly rearwardly results in the desired clearance and the proper presentation of the cutting edges to the work. The cutter seat is provided with laterally spaced cylindrical recesses 20 internally shouldered at 120 which in the embodiment illustrated merge while at the same time providing separate or distinct supports for the cylindrical head 21 of the cutter clamping screw 22 which is threaded centrally into the cutter. The recesses are laterally spaced sufficiently so that the cutter clamping screw 20 may be selectively engaged in one of the recesses to position and support the cutter with one of its cutting edges 19 in proper relation to the work. This enables the quick adjustment of the cutter for right or left hand cuts.

To reinforce the cutter seat and provide a complete support for the tool clamping screw head I provide an insert or filler block 34 externally conformed to fit within one of the recesses as is best shown in Figs. 4 and 5. This filler block having a segmental shouldered recess 35 which when the filler or insert is positioned in one of the recesses complements the wall of the other recess thereby providing a complete supporting wall for the head 21 of the screw 22. The shoulder 36 of the insert or filler complements the shoulder 120 at the inner end of the recess in which the clamping screw is positioned. This serves to provide a complete wall for the head of the screw as well as a complete flange 120 against which the screw is clamped. The insert is shouldered at 40 to engage the shoulder 120 of the recess in which the insert or filler is inserted and is retained by the screw.

In the embodiment illustrated the work rest supporting portion 23 of the body member 1 is formed separately and fixedly secured thereto by screws 24. The purpose of forming this part 23 separately from the main portion of the body member is to form the slideways therein. The member 23 is provided with downwardly converging ways 25 adapted to slidably receive the work rests 26 which are provided with work engaging rollers 27 coacting with the work as indicated at 28. It should be borne in mind that in Fig. 2 the tool is in a retracted position. The work rests are provided with longitudinal slots 261 receiving the screws 28 for clamping them in their adjusted positions. The work rest adjusting screws 29 are provided for accurate adjustment of the work rests. These screws are provided with flanges 30 which engage the notches or slots 31 in the work rests 26.

In addition to providing a cutter adapted for right and left hand cuts, the tool is of long life and may be repeatedly sharpened as is indicated by the sharpener 32 in Fig. 9 which illustrates the cutter as having a very substantial portion thereof removed by repeated sharpening. The relation of one cutting edge of the tool to the work indicated at 33 in Fig. 8 is shown in that figure.

To facilitate the adjustment of the tool for right and left hand cuts I provide a gauge designated generally by the numeral 37 and having a crosshead 38 at its inner end and a lug 39 at its outer end. The lug 39 may be engaged with one side of the tool seat as is illustrated in Fig. 2 with one arm of the crosshead projecting above the face of the tool seat so that the edge of the cutter may be adjusted into position. When the tool is to be adjusted for the opposite cut the gauge is engaged with the opposite side of the tool seat and the other arm of the crosshead then projects in position to facilitate the adjustment of the cutter.

I have illustrated and described my invention in one very practical embodiment. I have not attempted to illustrate or describe other adaptations as it is believed this disclosure will enable those skilled in the art to practice the invention as may be desired.

Having thus described the invention, what is claimed as new and is desired to be secured by Letters Patent is:

1. In a box tool, the combination of a body member, a tool holder linearly adjustably mounted on said body member and provided with a flat inclined tool seat disposed at an acute angle to the line of adjustment of said holder, a truncated conical tool arranged on said tool seat with its widest side spaced from said seat and having a peripheral notch defining a cutter at each end of the notch, said tool holder being provided with cylindrical internally shouldered merging recesses, and a tool clamping screw having central threaded engagement with said tool and having a cylindrical head selectively engageable with said recesses in said tool holder to seat on the said shoulders therein.

2. In a tool assembly, the combination of a body member, a tool holder adjustably mounted on said body member and provided with a tool seat, a circular tool arranged on said seat and having a peripheral notch defining a cutter at each end of the notch, said tool holder being provided with cylindrical internally shouldered merging recesses, a tool clamping screw having threaded engagement with said tool and having a cylindrical head selectively engageable with said recesses in said tool holder to seat upon said shoulder therein, and a filler block for the other recess adapted to be fittingly received therein and shouldered to engage the shoulder of the recess and having segmentally curved recesses on one side thereof complementing the wall of the recess in which the screw is disposed and having outwardly facing shoulders complementing the shoulder of such recess whereby a complete supporting wall is provided for the head of the tool clamping screw.

3. In a tool assembly, the combination of a body member, a tool holder provided with a tool seat, a circular tool arranged on said seat and having a peripheral notch defining a cutter at each end of the notch, said tool holder being provided with cylindrical internally shouldered merging recesses, a tool clamping screw having threaded engagement with said tool and having a cylindrical head selectively engageable with said recesses in said tool holder to seat upon said shoulder therein, and a filler block for the other recess adapted to be fittingly received therein and shouldered to engage the shoulder of the recess and having segmentally curved recesses on one side thereof complementing the wall of the recess in which the screw is disposed and having outwardly facing shoulders complementing the shoulder of such recess whereby a complete supporting wall is provided for the head of the tool clamping screw.

4. In a tool assembly, the combination of a body member, a tool holder adjustably mounted on said body member and provided with a tool seat, a circular tool arranged on said seat and having a peripheral notch defining a cutter at each end of the notch, said tool holder being provided with merging recesses, a tool clamping screw having threaded engagement with said tool and selectively engageable with said recesses in said tool holder, and a filler block selectively engageable with the other recesses adapted to be fittingly received therein and segmentally curved on one side to complement the wall of the recess in which the screw is disposed whereby a complete supporting wall is provided for the tool clamping screw.

5. In a tool assembly, the combination of a body member, a tool holder provided with a tool seat, a circular tool arranged on said seat and having a peripheral notch defining a cutter at each end of the notch, said tool holder being provided with merging recesses, a tool clamping screw having threaded engagement with said tool and having a head selectively engageable with said recesses in said tool holder, and a filler block selectively engageable with the other recesses adapted to be fittingly received therein and segmentally curved on one side to complement the wall of the recess in which the screw is disposed whereby a complete supporting wall is provided for the tool clamping screw.

References Cited in the file of this patent

UNITED STATES PATENTS

| | | |
|---|---|---|
| 624,490 | Hoffman | May 9, 1899 |
| 1,418,983 | Smith | June 6, 1922 |
| 2,289,344 | Cedarleaf | July 14, 1942 |
| 2,346,084 | Sanocki | Apr. 4, 1944 |
| 2,364,320 | Schlitters | Dec. 5, 1944 |
| 2,380,039 | Gideon | July 10, 1945 |
| 2,389,853 | Harris | Nov. 27, 1945 |
| 2,530,550 | Staples | Nov. 21, 1950 |
| 2,587,370 | Nelson | Feb. 26, 1952 |
| 2,608,121 | Fellroth | Aug. 26, 1952 |
| 2,617,177 | Montgomery | Nov. 11, 1952 |
| 2,687,664 | Smith | Aug. 31, 1954 |

FOREIGN PATENTS

| | | |
|---|---|---|
| 559,039 | Great Britain | Feb. 1, 1944 |
| 703,058 | Great Britain | Jan. 27, 1954 |